United States Patent [19]

Seri et al.

[11] Patent Number: 5,480,740
[45] Date of Patent: Jan. 2, 1996

[54] HYDROGEN STORAGE ALLOY AND ELECTRODE THEREFROM

[75] Inventors: Hajime Seri, Izumiotsu; Yasuharu Yamamura, Katano; Yoichiro Tsuji, Hirakata; Naoko Owada, Katano; Tsutomu Iwaki, Yawata, all of Japan

[73] Assignee: Matushita Electric Industrial Co., Ltd., Osaku, Japan

[21] Appl. No.: 197,432

[22] Filed: Feb. 16, 1994

[30] Foreign Application Priority Data

Feb. 22, 1993 [JP] Japan .................................. 5-057856
Feb. 22, 1993 [JP] Japan .................................. 5-057872

[51] Int. Cl.$^6$ ........................ H01M 4/38; C22C 22/00
[52] U.S. Cl. ........................ 429/59; 429/221; 429/223; 420/900; 420/422; 148/421
[58] Field of Search ............................ 429/59, 233, 221; 420/900, 422; 148/421

[56] References Cited

U.S. PATENT DOCUMENTS

| | | | |
|---|---|---|---|
| 4,946,646 | 8/1990 | Gamo et al. | 420/415 |
| 4,948,423 | 8/1990 | Fetcenko et al. | 75/10.14 |
| 5,096,667 | 3/1992 | Fetcenko | 420/580 |
| 5,149,383 | 9/1992 | Seri et al. | 148/400 |
| 5,205,985 | 4/1993 | Seri et al. | 420/422 |

FOREIGN PATENT DOCUMENTS

| | | |
|---|---|---|
| 1-48370 | 2/1989 | Japan . |
| 1-60961 | 3/1989 | Japan . |
| 1102855 | 4/1989 | Japan . |
| 3289041 | 12/1991 | Japan . |
| 4-63240 | 2/1992 | Japan . |
| 4143254 | 5/1992 | Japan . |
| 4187733 | 7/1992 | Japan . |
| 4301045 | 10/1992 | Japan . |

*Primary Examiner*—John S. Maples
*Attorney, Agent, or Firm*—Panitch Schwarze Jacobs & Nadel

[57] ABSTRACT

A hydrogen storage alloy preferably used for electrodes in an alkaline storage battery is provided. The alloy is of the general formula $ZrMn_wV_xMo_bM_yNi_z$, wherein M is at least one element selected from the group consisting of Fe and Co and $0.4 \leq w \leq 0.8$, $0 \leq x \leq 0.3$, $0.05 \leq b \leq 0.2$, $0 \leq y \leq 0.2$, $1.0 \leq z \leq 1.5$, and $2.0 \leq w+x+b+y+z \leq 2.4$. The alloy has C15-type Laves phases of a crystal structure similar to that of $MgCu_2$ as a main alloy phase, and a lattice constant "a" such that $7.05$ Å $\leq a \leq 7.13$ Å.

4 Claims, 2 Drawing Sheets

HYDROGEN STORAGE ALLOY AND ELECTRODE THEREFROM

FIELD OF THE INVENTION

The present invention relates to an alloy which can electrochemically absorb and desorb hydrogen in a reversible manner. It also relates to an electrode using said alloy.

BACKGROUND OF THE INVENTION

Storage batteries, which are widely used as power sources in a variety of applications, are typically classified into two general groups: lead storage batteries and alkaline storage batteries. Between the two groups, alkaline storage batteries tend to be more reliable, and can be made smaller and lighter. Small alkaline batteries are generally favored for portable electric appliances, while large alkaline batteries have been used mainly in conjunction with industrial equipment.

While some alkaline storage batteries use, for example, silver oxide or simply air for their positive electrode, more commonly the positive electrode is nickel. Nickel electrodes have been particularly popular since they were reconfigured from a pocket type to a sintered type, and became even more popular with the development of hermetic-sealing. Cadmium is most commonly used to form the negative electrode of alkaline storage batteries, however other materials, including zinc, iron, hydrogen, and the like have also been employed.

There is considerable commercial interest in storage batteries that have a higher energy density than batteries currently available. By "energy density" is meant the product of the battery capacity and the battery voltage per unit weight or volume, usually represented by Wh/kg or Wh/l. Toward achieving this goal, researchers have investigated nickel-hydrogen storage batteries which incorporate hydrogen storage electrodes. The alloys in these electrodes, or the hydride form of such alloys which form upon the absorption of hydrogen by the alloys, can absorb and desorb hydrogen in a reversible manner, and thus the alloys and the electrodes made from these alloys have come to be known as hydrogen storage alloys and hydrogen storage electrodes (or hydrogen storage alloy electrodes), respectively.

Batteries made with hydrogen storage electrodes have a larger theoretical capacity density compared to batteries formed with cadmium electrodes. By "capacity density" is meant the discharge capacity per unit weight or unit volume of an alloy, usually represented by mAh/g or mAh/cc. Also, batteries that employ hydrogen storage electrodes are not susceptible to the formation of dendrites, which is a problem with zinc electrodes that can cause a battery to short-circuit. These advantageous properties, as well as the promise of a longer cycle life and a reduction in the environmental concerns inherent in zinc and cadmium containing electrodes/batteries, have encouraged research into developing alloys suited for hydrogen storage electrodes, and particularly negative electrodes for alkaline storage batteries. By "cycle-life" is meant the ability of a battery to maintain a high discharge capacity after repeated charging and discharging cycles.

Prior art alloys for hydrogen storage electrodes include multi-element alloys such as those of either the Ti—Ni system, or the La (or Mm)—Ni system (where Mm is a misch metal). Multi-element alloys are typically prepared through either an arc melting process, an induction heating melting process, or some similar process.

The multi-element alloys of the Ti—Ni system are classified as an AB type (where A is La, Zr, Ti or an element with a similar affinity for hydrogen, and B is Ni, Mn, Cr or any other transition metal). When this type of alloy is used as the negative electrode in an alkaline storage battery, the electrode exhibits a relatively large discharge capacity during the initial charging and discharging cycles. However, electrodes comprising these alloys do not maintain their large discharge capacity after repeated charging and discharging cycles, i.e., do not have large saturation discharge capacities.

Another multi-element alloy is the La (or Mm)—Ni system, which is classified as an $AB_5$-type, where A and B are defined as above in relation to the AB type of alloy. These electrodes, and particularly electrodes made from the Mm—Ni system, have been put to commercial use as negative electrodes, but suffer from several disadvantage. For example, electrodes based on this class of alloy have a relatively small discharge capacity and an undesirably short cycle-life for a storage battery. In addition, the materials for these alloys are expensive. Therefore, it is desired to develop novel alloys from which hydrogen storage electrodes having a large discharge capacity and a long cycle-life can be made.

A Laves phase alloy of an $AB_2$-type has the potential to overcome many of the shortcomings of the multi-element alloys described above. $AB_2$-type alloys have two main crystal structures: a C15 face-centered cubic structure, as present in $MgCu_2$, and a C14 hexagonal structure, as present in $MgZn_2$. Electrodes for a storage battery formed from a Laves phase alloy of an $AB_2$-type have relatively high hydrogen storing capability and exhibit a high capacity and a long cycle-life. Alloys having a Laves phase of the $AB_2$-type are known in the art. See, e.g., U.S. Pat. No. 4,946,646 (ABα alloy), U.S. Pat. No. 5,149,383 (alloy comprising $Zr_\alpha Mn_\beta M_\tau Cr_\delta Ni_\epsilon$), U.S. Pat. No. 5,205,985 (alloy comprising $ZrMn_w V_x M_y Ni_z$), and U.S. Pat. No. 5,096,667 (alloy comprising V, Ti, Zr, Ni and Cr).

By adjusting the composition in a Laves phase alloy comprising Zr, Mn, V, Cr and Ni, a hydrogen storage electrode having a discharge capacity of 350 mA-hr/g or above has been obtained (U.S. Pat. No. 5,149,383). In addition, by adjusting the composition in a Laves phase alloy comprising Zr, Mn, V, M and Ni (where M represents a member selected from the group consisting of Fe and Co), the discharge characteristics during the early charging and discharging cycles of a hydrogen storage electrode have been improved while maintaining the high capacity of the electrodes (U.S. Pat. No. 5,205,985).

When a Laves phase alloy of the $AB_2$-type is used as an electrode in a storage battery, it is possible to obtain a larger discharge capacity and a longer cycle-life compared with electrodes based on the multi-element alloys of the Ti—Ni system or the La (or Mm)—Ni system. However, further improvements in the performance of negative electrodes formed from Laves phase alloys of the $AB_2$-type are still desirable.

When a nickel-hydrogen storage battery is configured with a hydrogen storage electrode known in the prior art, the temperature of the storage battery will rise during rapid charging of the battery. The temperature rise is primarily due to heat generated by hydrogenation or similar reactions at the negative electrode. Therefore, and undesirably, the hydrogen equilibrium pressure of the hydrogen storage alloy in the negative electrode rises. Another disadvantage is that the gas pressure inside a battery vessel rises with increasing temperature, thereby inviting liquid to leak from the vessel, and causing a large decrease in the amount of the hydrogen stored in the alloy.

Thus, there is a great demand for a novel alloy which can be used to produce an electrode capable of maintaining the inner gas pressure of the battery at a low level, even at the high temperatures (about 80° C.) present during the rapid charging cycle. There is also a demand for batteries which do not leak liquid, which maintain a high capacity of hydrogen storage, and have excellent initial discharge characteristics and saturation discharge capacities.

SUMMARY OF THE INVENTION

It is an object of the present invention to provide an alloy for use in hydrogen storage electrodes which overcomes the above-discussed and numerous other disadvantages and deficiencies of the prior art.

It is another object of the present invention to provide a hydrogen storage electrode for use as a negative electrode of an alkaline storage battery.

It is a further object of the present invention to provide a method for producing the above-mentioned hydrogen storage alloy.

The present invention provides an alloy represented by the general formula $ZrMn_wV_xMo_bM_yNi_z$, wherein M is selected from the group consisting of Fe and Co, and wherein $0.4 \leq w \leq 0.8$, $0 \leq x \leq 0.3$, $0.05 \leq b \leq 0.2$, $0 \leq y \leq 0.2$, $1.0 \leq z \leq 1.5$, and $2.0 \leq w+x+b+y+z \leq 2.4$. The alloy of the invention has C15-type Laves phases of a crystal structure similar to that of $MgCu_2$ as a main alloy phase, and a lattice constant "a" such that $7.05 \text{ Å} \leq a \leq 7.13 \text{ Å}$.

In a preferred embodiment, $b \leq x$.

In another preferred embodiment, $y \leq x+b$, and $z-x-b \leq 1.2$.

In still another preferred embodiment, the alloy has been subjected to a homogenizing treatment comprising exposure to 1000° C. to 1300° C. for at least one hour in a vacuum or in an inert-gaseous atmosphere.

The present invention still further relates to an electrode which includes the above-mentioned hydrogen storage alloy or a hydride thereof.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF PREFERRED EMBODIMENTS

Figure 1:
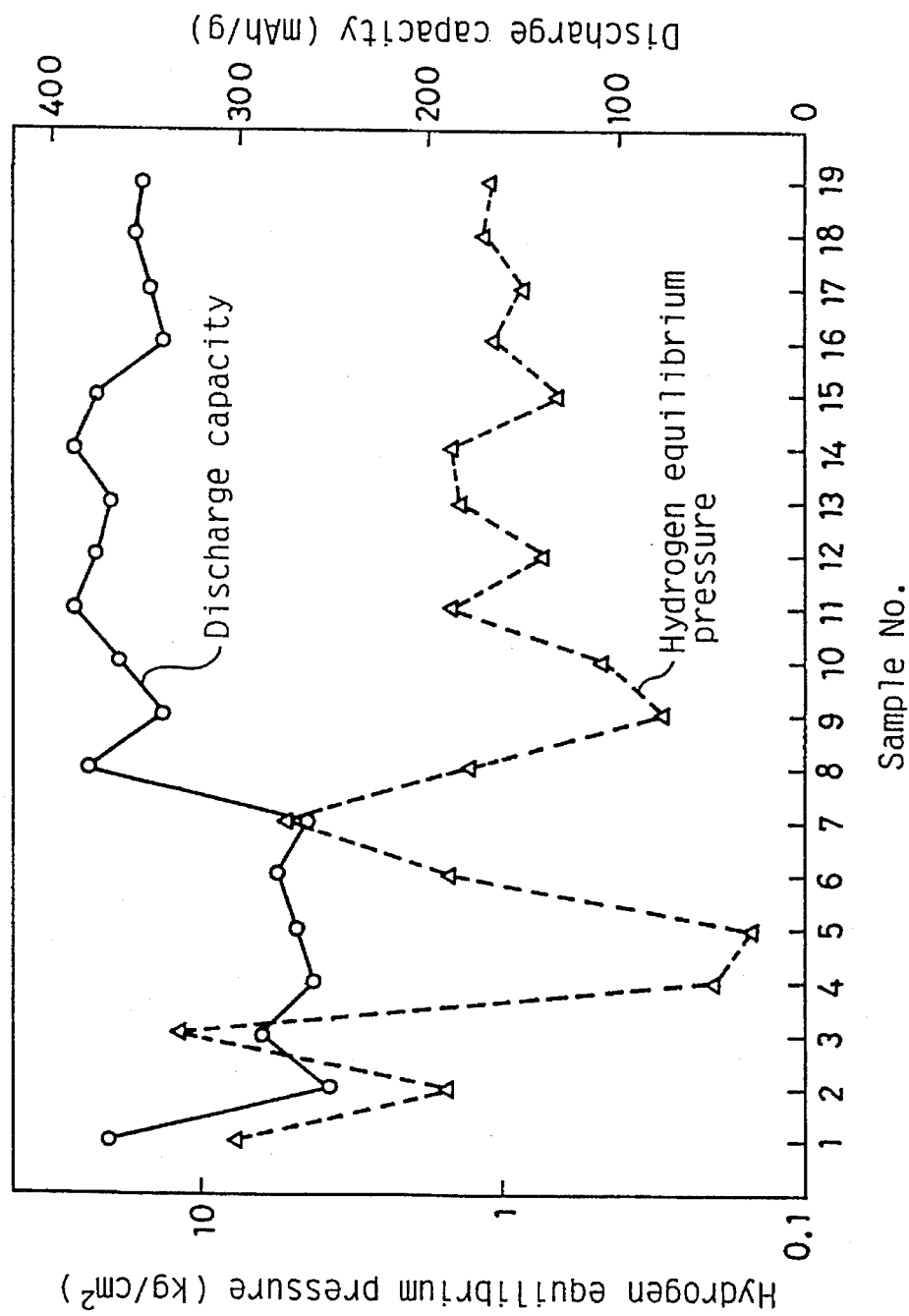
FIG. 1 is a diagram showing the correlation between the hydrogen equilibrium pressure at 70° C. (broken line), and the discharge capacity after 50 charging and discharging cycles (solid line), of the alloys and half-cell comprising those alloys, respectively, for alloys of the invention and prior art alloys.

The present invention is directed to alloys, and in particular alloys represented by the general formula $ZrMn_wV_xMo_bM_yNi_z$, wherein M represents at least one element selected from the group consisting of Fe and Co, and to electrodes formed from such alloys. In the following paragraphs, composition ranges refer to preferred composition ranges according to the present invention.

The alloy of the present invention constitutes an improvement over prior art alloys of the Zr—Mn—V—M—Ni system, wherein M represents at least one element selected from the group consisting of Fe and Co, which have hydrogen storage properties. By including Mo in the alloy of the invention, or by replacing V with Mo in the prior art alloys, the hydrogen equilibrium pressure of the alloy is lowered, and therefore a battery having a negative electrode formed of the molybdenum containing alloy of the invention will display a desirably low hydrogen equilibrium pressure even at the high temperatures encountered during rapid charging of the battery.

While not wishing to be bound by this theory, it is believed that the large atomic radius of molybdenum enlarges the crystal lattice constant of an alloy containing molybdenum, and this enlargement allows for the hydrogen equilibrium pressure of the alloy to be lowered. Batteries formed of electrodes containing such an alloy demonstrate reduced gas pressure, and therefore have minimal problems with liquid leakage and loss of stored hydrogen. The effect of vanadium on the hydrogen absorption and desorption characteristics of the alloy differs only slightly from that of molybdenum, and hence a storage battery configured with an electrode alloy including molybdenum in place of vanadium can maintain the high capacity and initial discharge characteristics of the prior art vanadium-containing hydrogen storage electrodes.

However, if the molybdenum content of the alloy is such that the mole ratio of molybdenum to zirconium, hereinafter "b", exceeds 0.2, the homogeneity of the alloy is considerably lowered, and the amount of hydrogen that can be absorbed by, or desorbed from the alloy, is reduced. In contrast, if "b" is smaller than 0.05, there is insufficient molybdenum present in the alloy to provide the desirable lowering of the hydrogen equilibrium pressure. Thus, it is preferred that the mole ratio of molybdenum to zirconium is such that $0.05 \leq b \leq 0.2$.

Vanadium addition to an alloy can desirably increase the amount of hydrogen that can be absorbed by or desorbed from the alloy. However, the presence of vanadium can also undesirably reduce the homogeneity of the alloy. Thus, if the mole ratio of vanadium to zirconium, hereinafter "x", exceeds 0.3, the amount of hydrogen which may be absorbed by or desorbed from the alloy decreases. Thus, it is preferred that the mole ratio of vanadium to zirconium is such that $x \leq 0.3$.

Both vanadium and molybdenum have a large atomic radius and hence their presence in the alloy of the invention tends to lower the homogeneity of the alloy. Between the two elements, vanadium causes a smaller disruption of alloy homogeneity than molybdenum. If an alloy has a molybdenum content "b" which is less than the vanadium content "x", then the discharge capacity of an electrode made of such alloy is particularly large. Thus, it is preferred that $b \leq x$ in the alloys and electrodes therefrom of the invention.

While the presence of nickel will sometimes reduce an alloy's ability to absorb or desorb hydrogen, nickel is desirably present in an alloy because it contributes to an improvement in the activity of the electrochemical process for absorbing and desorbing hydrogen. By "activity" is meant the readiness of the alloy to absorb and desorb hydrogen. When the nickel content of the alloy, measured by the mole ratio of nickel to zirconium, hereinafter "z", exceeds 1.5, the amount of hydrogen which can be absorbed by or desorbed from the alloy decreases because the hydrogen equilibrium pressure becomes very high. In contrast, when an alloy has a nickel content such that "z" is less than 1.0, the discharge capacity of an electrode made of the alloy becomes small because the activity of the electrochemical process for absorbing or desorbing hydrogen is insufficient. Thus, the nickel content of alloys and electrodes made therefrom according to the invention is preferably such that $1.0 \leq z \leq 1.5$.

Since the effect of vanadium or molybdenum on the hydrogen storage properties of an alloy is opposite to that of nickel, as described above, it is important to secure an appropriate balance between the three metals in an alloy or electrode therefrom. It has been found that when z−x−b is 1.2 or less, the amount of hydrogen that can be absorbed by or desorbed from the alloy becomes particularly large. Therefore it is preferred that $z-x-b \leq 1.2$.

The presence of M in an alloy, where M is selected from the group consisting of Fe and Co, contributes to a further improvement in the activity of the electrochemical process for absorbing or desorbing hydrogen. However, it has been found that if the content of M, measured by the mole ratio of M to zirconium, hereinafter "y", exceeds 0.2, the presence of M adversely decreases the capability of an alloy to absorb or desorb hydrogen. Therefore, it is preferred that $y \leq 0.2$ in the alloys and electrodes therefrom of the invention.

It has been found that if an alloy contains less M than the total vanadium and molybdenum, then the hydrogen equilibrium pressure is further lowered and the alloy and electrode therefrom is particularly suited for rapid charging. It is therefore desirable that $y \leq x + b$.

Manganese influences the flatness of the hydrogen equilibrium pressure of a P-C-T curve. When manganese is present in an alloy of the invention such that the mole ratio of manganese to zirconium, hereinafter "w", is 0.4 or above, an electrode made from such alloy has an increased discharge capacity. However, when the content of manganese becomes too large, for example, when "w" exceeds 0.8, a large amount of the manganese dissolves from the electrode into the electrolyte solution, thereby reducing the cycle life of the electrode. It is therefore preferred that $0.4 \leq w \leq 0.8$ in the alloys and electrodes therefrom of the invention.

The homogeneity and crystallinity of an alloy according to the invention can be improved by subjecting the alloy, after preparation, to a homogenizing heat treatment. Electrodes having increased discharge capacity may be prepared from alloys that have been subjected to a homogenizing heat treatment. However, if the temperature of the heat treatment is lower than about 1000° C., the heat treatment has little effect on the properties of the alloy or the electrode derived therefrom. Also, if an alloy is treated at a temperature higher than about 1300° C., the discharge capacity of an electrode made from such alloy is reduced. It is believed that heat treatment temperatures above 1300° C. cause manganese to evaporate from the alloy, which adversely affects the alloy's composition and properties.

The heat treatment is observed to have no effect if continued for less than about one hour. To prevent undesirable oxidation of the alloy, the heat treatment may be conducted in either an inert-gaseous atmosphere, or under vacuum. Preferably, the homogenizing heat treatment of the prepared alloy is conducted at a temperature of about 1000° C. to about 1300° C., in a vacuum or in an inert gas atmosphere, for at least one hour.

As will be apparent from the following description of embodiments of the invention, the hydrogen storage alloy prepared in accordance with the present invention can suppress a rise in the hydrogen equilibrium pressure even at the high temperatures observed during rapid charging of the battery. This is accomplished by adding molybdenum to the alloy composition of the prior art hydrogen storage electrode, or by replacing V in the prior art alloy composition with molybdenum. The resulting alloy can absorb or desorb a large amount of hydrogen even during the rapid charging process. Further, molybdenum does not adversely influence the initial discharge characteristics of a storage battery configured with an electrode made from molybdenum-containing alloy as its negative electrode. A storage battery configured with an electrode made from the alloy of the invention has excellent discharge characteristics compared with similar prior art storage batteries, and does not achieve this improved performance at the expense of reducing the high service capacity of the electrode.

In summary, an alkaline storage battery, e.g., a nickel-hydrogen storage battery, configured with an electrode of the present invention can maintain the gas pressure inside a battery vessel at a low level even at the high temperatures encountered during rapid charging of the battery. Thus, alkaline storage batteries comprising an electrode of the invention are resistant to liquid leakage and can have a high capacity during the initial charging and discharging periods, in comparison to alkaline storage batteries comprising prior art electrodes.

EXAMPLE 1

Preparation of Alloy Samples

In the following paragraphs, examples of the present invention will be described with reference to the attached drawings.

Commercially available zirconium, manganese, vanadium, molybdenum, iron, cobalt and nickel were used to prepare the alloys listed in TABLE 1. In TABLE 1, Sample Nos. 1–7 represent comparative examples which differ from the compositions of the invention in terms of constituents and constituent ratios. Sample Nos. 8–19 represent working examples in accordance with the present invention.

TABLE 1

| SAMPLE NUMBER | COMPOSITION |
| --- | --- |
| 1 | $ZrMn_{0.6}V_{0.1}Fe_{0.1}Ni_{1.2}$ |
| 2 | $ZrMn_{0.9}V_{0.2}Mo_{0.1}Co_{0.1}Ni_{1.2}$ |
| 3 | $ZrMn_{0.6}V_{0.2}Mo_{0.1}Fe_{0.3}Ni_{1.3}$ |
| 4 | $ZrMn_{0.6}V_{0.3}Mo_{0.3}Co_{0.1}Ni_{1.1}$ |
| 5 | $ZrMn_{0.6}V_{0.4}Mo_{0.2}Ni_{1.1}$ |
| 6 | $ZrMn_{0.6}V_{0.1}Mo_{0.1}Ni_{0.9}$ |
| 7 | $ZrMn_{0.6}V_{0.1}Mo_{0.1}Ni_{1.6}$ |
| 8 | $ZrMn_{0.6}V_{0.2}Mo_{0.1}Fe_{0.1}Ni_{1.2}$ |
| 9 | $ZrMn_{0.7}V_{0.1}Mo_{0.2}Fe_{0.2}Ni_{1.0}$ |
| 10 | $ZrMn_{0.8}V_{0.15}Mo_{0.15}Fe_{0.05}Ni_{1.1}$ |
| 11 | $ZrMn_{0.6}V_{0.2}Mo_{0.1}Co_{0.1}Ni_{1.2}$ |
| 12 | $ZrMn_{0.5}V_{0.3}Mo_{0.05}Co_{0.2}Ni_{1.1}$ |

TABLE 1-continued

| SAMPLE NUMBER | COMPOSITION |
|---|---|
| 13 | $ZrMn_{0.6}V_{0.2}Mo_{0.1}Co_{0.05}Ni_{1.3}$ |
| 14 | $ZrMn_{0.7}V_{0.2}Mo_{0.1}Fe_{0.05}Co_{0.05}Ni_{1.1}$ |
| 15 | $ZrMn_{0.7}V_{0.2}Mo_{0.1}Ni_{1.1}$ |
| 16 | $ZrMn_{0.4}V_{0.1}Mo_{0.2}Ni_{1.4}$ |
| 17 | $ZrMn_{0.8}V_{0.1}Mo_{0.15}Ni_{1.1}$ |
| 18 | $ZrMn_{0.7}Mo_{0.2}Co_{0.1}Ni_{1.2}$ |
| 19 | $ZrMn_{0.7}Mo_{0.2}Ni_{1.25}$ |

Each alloy sample of TABLE 1 was prepared by co-melting the appropriate metals in an arc melting furnace, under an argon atmosphere. Alloys having a high manganese content ($0.8 \leq w$) were difficult to prepare in the arc melting furnace because the manganese tended to evaporate rather than form the alloy. The alloys with a high manganese content were therefore prepared in an induction heating furnace. After being prepared, each alloy was heat-treated for 12 hours at 1100° C. under vacuum, resulting in a homogenized alloy sample.

Each alloy of TABLE 1 was characterized by X-ray diffraction, P-C-T, and performance as a negative electrode in a half-cell. The P (hydrogen pressure), C (composition and T (temperature) test generates a pressure-composition isotherm, which is a measure of the amount of hydrogen absorbed by, or desorbed from, the alloy in a hydrogen gas atmosphere.

According to X-ray diffraction, each alloy sample was comprised mainly of the C15-type Laves crystal phase (crystal structure of $MgCu_2$-type, face centered cubic structure). However, Sample No. 4 additionally contained a large quantity of the C14-type Laves crystal phase (hexagonal structure of $MgZn_2$-type), and thus had a low homogeneity. X-ray diffraction also observed a sharpening, and overall increase in size, of peaks corresponding to face-centered cubic structures, upon comparing alloys before and after heat-treatment. This indicates that the heat treatment increased the proportion of C15-type Laves crystal phase, and improved the homogeneity and crystallinity of the alloys. X-ray diffraction also confirmed that the intended alloy, having a homogeneous composition, was obtained for samples having a high manganese content ($0.8 \leq w$).

Crystal lattice constants ("a") for all the samples were found to be within the range of 7.05–7.13 Å, with the only exception being Sample No. 7 which had an "a" of less than 7.05 Å.

P-C-T measurements at 70° C. were performed on each of the alloy samples of TABLE 1. P-C-T measurement provides a hydrogen equilibrium pressure for each alloy sample, which are shown in FIG. 1. According to FIG. 1, the alloys of Samples 8–19 have a desirably smaller hydrogen equilibrium pressure compared with the prior art alloy of Sample 1. FIG. 1 also shows that prior art Sample Nos. 3 and 7, which contain Mo and a large amount of either M (Fe or Co) or Ni, have a high hydrogen equilibrium pressure.

EXAMPLE 2

Half-Cell Test

Each alloy of Example 1 was formed into a negative electrode and evaluated in a half-cell test. The test evaluated the electrochemical charging and discharging characteristics of the electrodes, including during the early charging and discharging cycles.

To form the electrode, each alloy of Sample Nos. 1–19 was pulverized to a particle size of 38 μm or smaller. To 1 g of each resultant alloy powder, 3 g of nickel carbonyl powder and 0.12 g of polyethylene fine powder were added as a conductive material and a binder, respectively. The whole was thoroughly stirred and mixed. The mixture thus obtained was formed, with the application of pressure, into a disk of 24.5 mm in diameter and 2.5 mm in thickness. The disk was heated for 1 hour at 130° C. in a vacuum, which melted the binder and produced a hydrogen storage electrode.

A nickel lead wire was attached to the hydrogen storage electrode, which became the negative electrode. A sintered nickel electrode having a capacity greater than the capacity of the negative electrode was used for the positive electrode. The negative and positive electrodes were placed, with a separator between them, in an electrolyte solution, to produce the half-cell for the half-cell test. A polyamide nonwoven fabric was used as the separator. The electrolyte solution was an aqueous potassium hydroxide solution having a specific gravity of 1.30.

Each half-cell was subjected to repeated charging and discharging at 25° C. During the five hour charge period, a current of 100 mA was supplied per gram of hydrogen storage alloy. Discharging was performed at a current of 50 mA per gram of alloy, and continued until the cell voltage decreased to 0.8 Volt. The discharge capacity of the negative electrode was measured during each charging and discharging cycle.

The half-cell tests revealed that each of the electrodes formed from the alloys of Sample Nos. 8–19 had discharge capacities in the range of 200 to 250 mA-hr/g during the first cycle, in the range of 280 to 320 mA-hr/g during the second cycle, and in the range of 340 to 390 mA-hr/g during the third cycle and in every cycle thereafter. Essentially the same results were obtained for a half-cell made from the alloy of Sample 1, a prior art alloy. Thus, it was found that the addition of Mo did not influence the discharging characteristics in the early charging and discharging cycles.

The half-cell tests were continued for 50 charging and discharging cycles. FIG. 1 shows the saturation discharge capacities per gram, for each of the electrodes, measured after 50 charging and discharging cycles. Cells using the prior art alloys of Sample Nos. 3–7 are seen to have small saturation discharge capacities, in the range of 240 to 290 mA-hr/g. This result demonstrates that the alloys of Sample Nos. 3, 4, 5 and 7 each have a small hydrogen storage capacity, and that alloy Sample No. 6 has a poor activity for the electrochemical process of absorbing and desorbing hydrogen.

The electrode formed from the alloy of Sample No. 2, which has a large manganese content, reacted violently with, and partially dissolved into, the electrolyte solution during the half-cell test: consequently, its discharge capacity decreased significantly with continuing charging and discharging cycles.

In contrast to electrodes formed from prior art alloys, the hydrogen storage electrodes of the present invention show a large saturation discharge capacity, in the range of 340 to 390 mA-hr/g. It was also found that, among the hydrogen storage electrodes of the present invention, those using the alloy of Sample Nos. 8 and 10–15, in which the content of molybdenum was smaller than the content of vanadium, had especially large saturation discharge capacities, in the range of 360 to 390 mA-hr/g.

EXAMPLE 3

Sealed-Type Nickel-Hydrogen Storage Battery

The alloys of Example 1 were used to prepare sealed-type nickel-hydrogen storage batteries in order to evaluate the charging and discharging characteristics thereof.

To form the batteries, each alloy of Sample Nos. 1–19 was pulverized to a particle size of 38 μm or smaller, and then mixed with an aqueous solution of polyvinyl alcohol (3 wt %). The mixture was stirred until it formed a paste. The paste-like electrode material was applied to an electrode support comprising foamed nickel sheet having a thickness of 1.0 mm, a porosity of 95%, and a mean pore size of 150 microns. The porous nickel sheet filled with the alloy paste was dried at 120° C., pressed by a pressure roller to form sheets, and then coated with a fluorocarbon resin powder. The sheets were cut into individual electrodes each having a width of 3.3 cm, a length of 21 cm and a thickness of 0.40 mm. A pair of lead wires was fixed at two positions of each electrode to form a negative electrode.

Each negative electrode was rolled up together with a positive electrode and a separator, with the separator being disposed between the two electrodes, to provide a cylindrical roll of electrodes. The cylindrical electrode roll thus obtained was placed into a size SC vessel. A standard foamed nickel electrode of 3.3 cm in width and 18 cm in length was used as the positive electrode. A polypropylene nonwoven fabric having hydrophilic characteristics was used as the separator. A solution of 30 g of lithium hydroxide dissolved in one liter of an aqueous potassium hydroxide solution having a specific gravity of 1.30, was used as the electrolyte solution. Finally, the cell was sealed, resulting in a sealed-type nickel-hydrogen battery.

A pressure sensor was mounted on each of the batteries in order to measure the gas pressures generated inside the vessels during rapid charging. In addition, a thermocouple was attached to each of the side faces of the storage battery vessels in order to monitor the temperature of each battery.

Each battery was activated by 20 charging and discharging cycles. During the charging cycle, each battery was charged to 120% at 0.1 C (10 hour rate) at 30° C. The discharging was performed at 0.2 C (5 hour rate) at 30° C., and continued until the battery voltage decreased to 0.8 Volts. A charging of 120% means that a quantity of electricity is provided that exceeds by 20% the quantity of electricity necessary for complete charging.

After activation, a set of batteries comprising each of the alloys of TABLE 1 was subjected to a normal charging procedure, as follows. Each battery was charged at 0.2 C until the gas pressure inside the battery vessels increased to 5 kg/cm$^2$, and then discharged at 0.2 C until the battery voltage decreased to 0.8 Volts. Normal charging, in contrast to rapid charging, involves a small charge current, e.g., 0.2 C, where rapid charging involves a larger charge current, e.g., –3 C.

Figure 2:
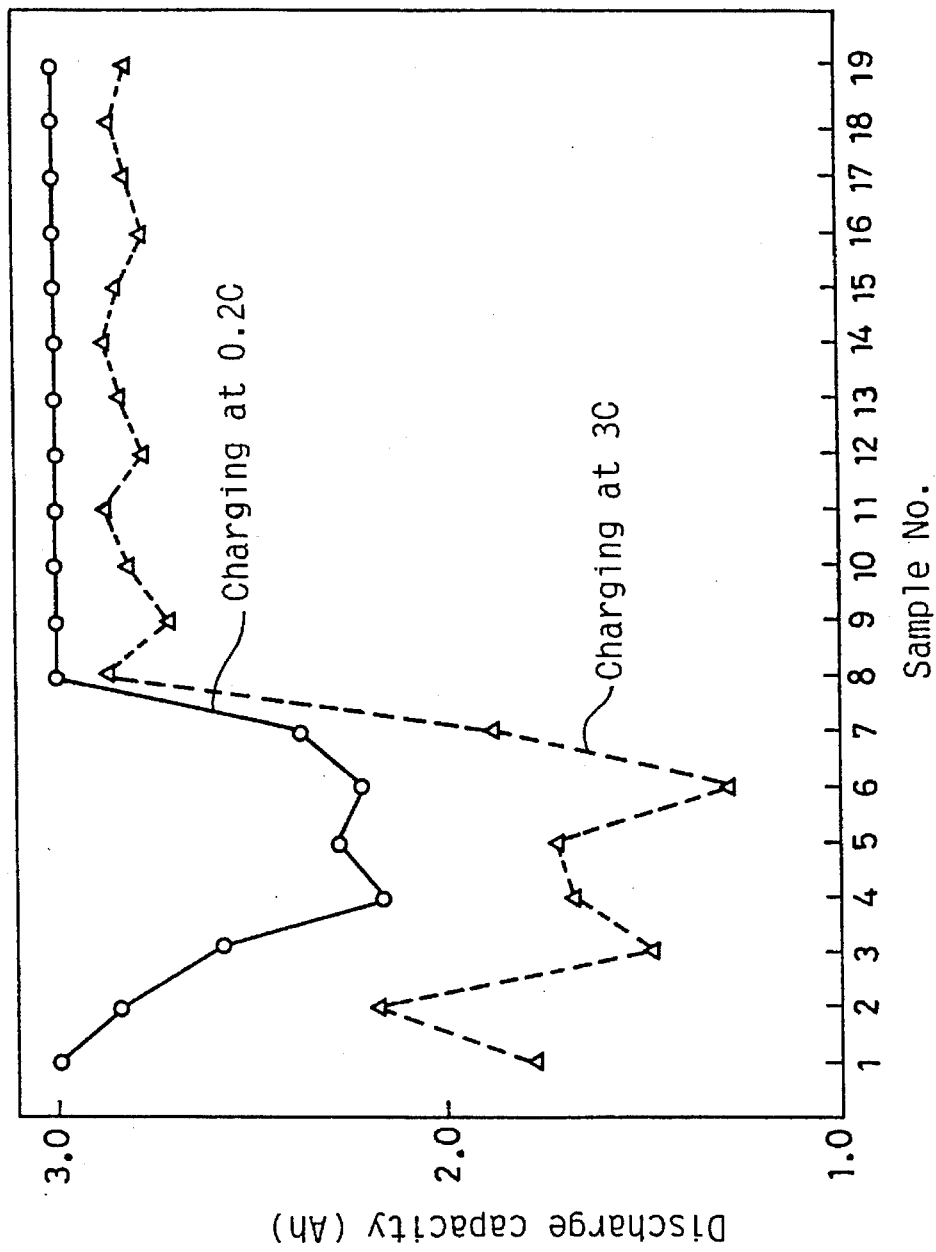
FIG. 2 is a diagram showing the discharging characteristics of batteries, whose capacities are limited by those of the positive electrode, during both rapid charging (broken line) and normal charging (solid line), where the batteries comprise alloys of the invention and prior art alloys.

The discharge capacities of batteries prepared from each of the alloys of TABLE 1, and subjected to activation followed by normal charging, appears as a solid line in FIG. 2.

A second set of batteries comprising 5 representatives from each of the 19 alloys of TABLE 1 was subjected to a rapid charging procedure, as follows. The batteries were placed in a plastic container and charged at 3 C (20 minute rate) until the gas pressure inside the battery increased to 5 kg/cm$^2$. During this charging process, the temperature inside each battery increased to about 70° C.–80° C. After charging, the batteries were cooled to 30° C., and then discharged at 0.2 C until the battery voltage decreased to 0.8 Volts.

The discharge capacities of batteries prepared from each of the alloys of TABLE 1, and subjected to activation followed by rapid charging, appears as a broken line in FIG. 2.

FIG. 2 compares the discharge capacities of sealed-type nickel-hydrogen batteries after being subjected to charging processes performed at 0.2 C (normal charging) and at 3 C (rapid charging). FIG. 2 shows that the battery using the alloy of Sample No. 1 exhibits a reduced discharge capacity after the charging process performed at 3 C. It is believed that the observed decrease in discharge capacity is due to the rise in the hydrogen equilibrium pressure caused by the temperature rise inside the vessel of the battery during charging at 3 C.

The alloys of Sample Nos. 2–7 are seen to have relatively small discharge capacities, even after normal charging, compared to the battery incorporating alloy number 1. It is further observed that batteries using these alloys (Sample Nos. 2–7) as electrodes have diminished discharge capacities after rapid charging.

In contrast, it was found that batteries using the hydrogen storage electrodes of the present invention had very large discharge capacities, with charging at either 0.2 C or 3 C, and thus display excellent charging characteristics, especially under rapid charging conditions.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentably novelty that reside in the present invention, including all features that would be treated as equivalents thereof by those skilled in the art to which this invention pertains.

We claim:

1. An alloy represented by the general formula $ZrMn_wV_xMo_bM_yNi_z$, wherein M is selected from the group consisting of Fe and Co, and wherein $0.4 \leq w \leq 0.8$, $0 \leq x \leq 0.3$, $0.05 \leq b \leq 0.2$, $b \leq x$, $0 \leq y \leq 0.2$, $1.0 \leq z \leq 1.5$, and $2.0 \leq w+x+b+y+z \leq 2.4$, said alloy having C15-type Laves phases of a crystal structure similar to that of $MgCu_2$ as a main alloy phase, and a lattice constant "a" such that 7.05 Å $\leq a \leq$ 7.13 Å.

2. A hydrogen storage electrode comprising the hydrogen storage alloy according to claim 1 or a hydride thereof.

3. The alloy of claim 1 wherein $y \leq x+b$ and $z-x-b \leq 1.2$.

4. The alloy prepared by exposing an alloy of claim 1 to a temperature of about 1000° C. to about 1300° C. for at least one hour in a vacuum or inert gaseous atmosphere.

* * * * *